United States Patent [19]

Dinkel et al.

[11] Patent Number: 4,526,417
[45] Date of Patent: Jul. 2, 1985

[54] BODY, PARTICULARLY FOR TRUCK, HAVING A BACK FOLDABLE SIDEWALL

[75] Inventors: Kurt Dinkel, Schwarzwaldstrasse 16, D-6980 Wertheim 2, Fed. Rep. of Germany; Rudolf Endpess, Wertheim-Lindelbach, Fed. Rep. of Germany

[73] Assignee: Kurt Dinkel, Wertheim, Fed. Rep. of Germany

[21] Appl. No.: 550,647
[22] PCT Filed: Feb. 16, 1983
[86] PCT No.: PCT/DE83/00029
   § 371 Date: Oct. 14, 1983
   § 102(e) Date: Oct. 14, 1983
[87] PCT Pub. No.: WO83/02922
   PCT Pub. Date: Sep. 1, 1983

[30] Foreign Application Priority Data

Feb. 17, 1982 [DE] Fed. Rep. of Germany ....... 3205657

[51] Int. Cl.³ .............................................. B62D 27/00
[52] U.S. Cl. .................................... 296/181; 296/183; 296/36; 105/378
[58] Field of Search ................ 296/181, 183, 36; 105/378; 49/103

[56] References Cited

U.S. PATENT DOCUMENTS 1,857,936  5/1932  Brugmann ........................... 49/103
4,341,413  7/1982  Woods ................................ 105/378
4,346,929  8/1982  Peters ................................. 296/181

FOREIGN PATENT DOCUMENTS 47944    7/1889  Fed. Rep. of Germany .
2358186  5/1975  Fed. Rep. of Germany .
2710141  9/1978  Fed. Rep. of Germany .
3017729 11/1981  Fed. Rep. of Germany .
355012   6/1905  France .

Primary Examiner—Robert R. Song
Attorney, Agent, or Firm—Balogh, Osann, Kramer, Dvorak, Genova & Traub

[57] ABSTRACT

A body structure, intended more particularly for trucks, comprising a lateral wall consisting of a lower part and an upper part adapted to swing up either above or below the roof, the upper part being entrained by the lower part, by means of an entraining device, either upwardly into its open position or downwardly into its closed position, the structure being improved, from the point of view of its present complex, rather unreliable, and relatively bulky entraining device, which may easily lead to injuries to the operator, in that the device consists of a rack-and-pinion drive located on each side of the lateral wall and guided on side posts, the rack being hinged by means of a lower rod part to a lever arm projecting downwardly in the closed position, from the lower part, and engaging at the top with toothing running along the outside of the hinge location of the relevant lower link, in which toothing, a pinion engages, the pinion being secured to the link axially of the bearing location thereof, the pitch diameter of the pinion being about 1.5 times the length of the lever arm.

8 Claims, 11 Drawing Figures

U.S. Patent Jul. 2, 1985 Sheet 3 of 7 4,526,417
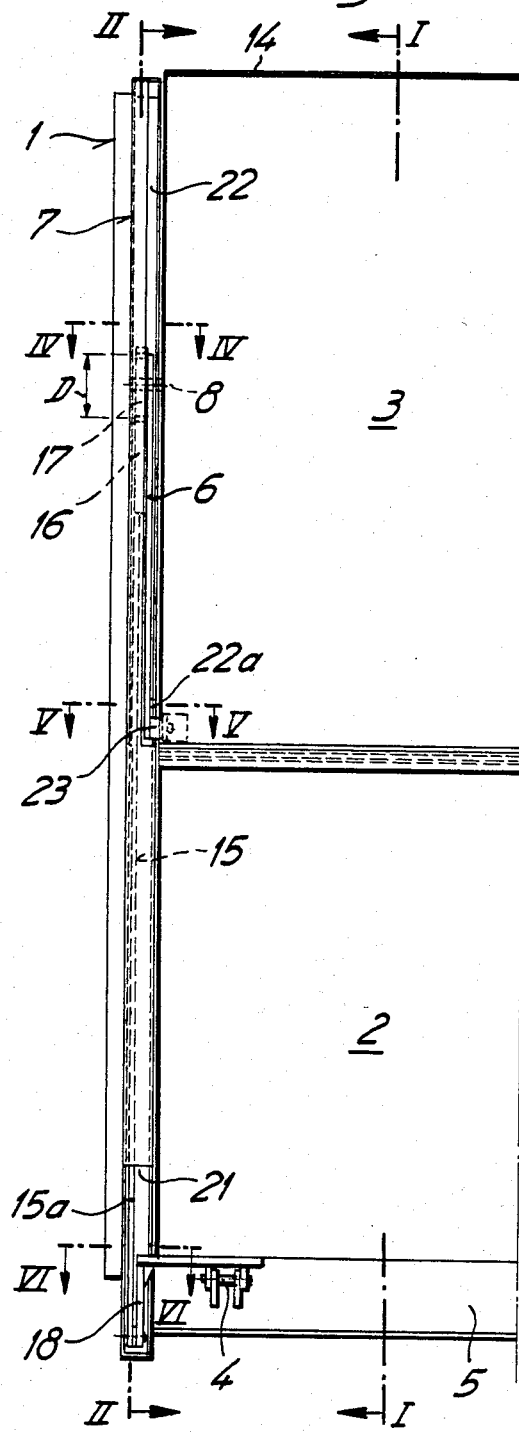
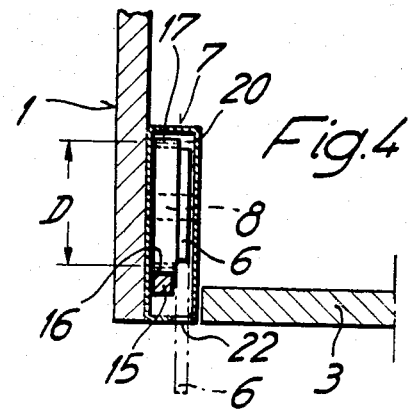
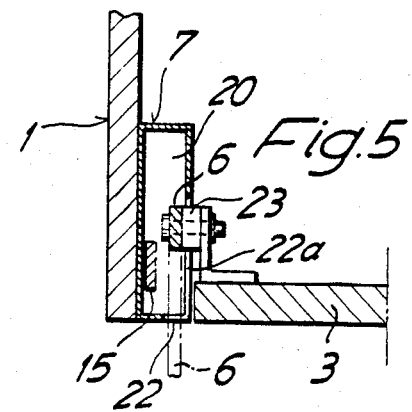
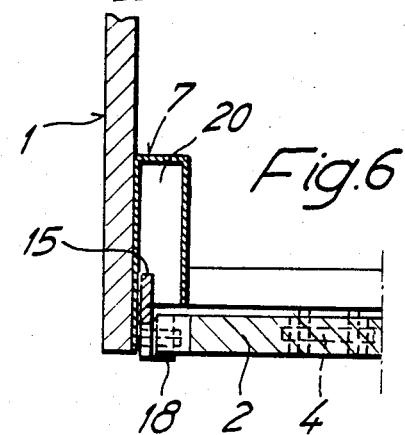

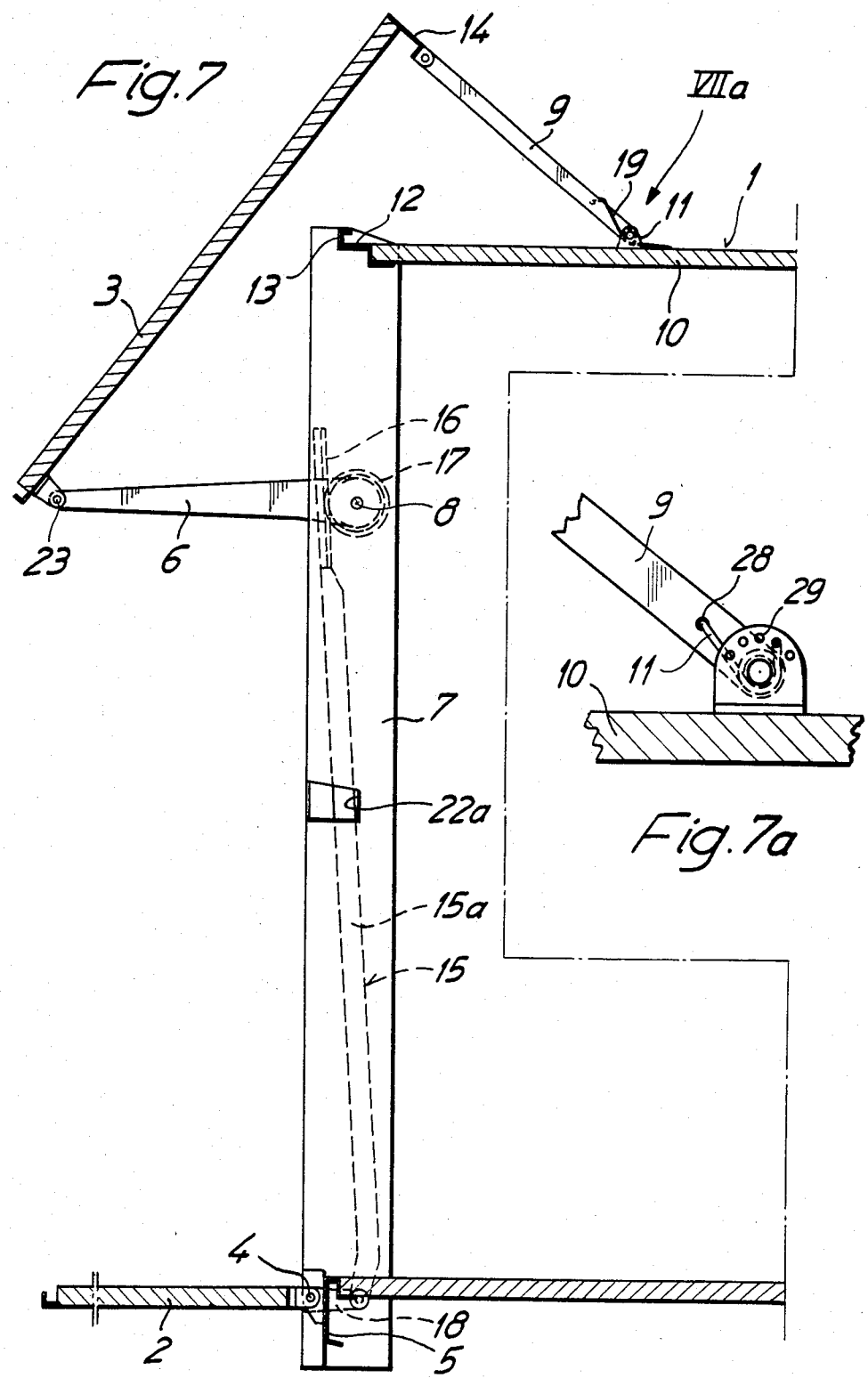

BODY, PARTICULARLY FOR TRUCK, HAVING A BACK FOLDABLE SIDEWALL

BACKGROUND OF THE INVENTION

1. Field of the Invention

The invention relates to a body structure, and more particularly to a two-part folding lateral wall such as is used in trucks or trailers or in a wall of a building.

2. Description of Prior Art

Regardless of whether the upper part of the lateral wall is adapted to fold up above or below the roof, such body structures are known in numerous designs. All of them, however, have the disadvantage that the entraining device running from the lower part of the lateral wall, which ensures appropriate simultaneous opening and closing of the upper part of the lateral wall, uses either cables (See, for example, German Patent Publication Nos. 23 58 186 and 24 14 642 and German Published patent application Nos. 24 00 242, 26 01 128, 70 10 141, 29 09 375, 28 13 593, 29 05 561 and 29 19 608), which are sensitive, subject to breakdowns, and need maintenance, or hinged couplings and additional sliding guides (See, for example, French Pat. No. 1,532,600 and German Published patent application No. 30 17 729), which are complex and costly, and some of which take up a considerable amount of space. Furthermore, most of the known designs involve a considerable risk of injury since, when the lower part is being folded up, the operator's hand may be trapped between the upper and lower parts as they come together.

SUMMARY OF THE INVENTION

It is the purpose of the invention to improve body structure in such a manner that, with structurally simple means, and, in spite of this, without appreciable maintenance, the opening and closing of the lower part of the lateral wall remains reliably associated with the opening and closing movements of the upper part of the lateral wall, the arrangement being such that there is practically no longer any danger of injury to the operator.

The proposed entraining device constitutes a structurally simple but still highly reliable drive-connection, requiring only minor occasional lubrication at its joints, such as has also hitherto been necessary at the bearing and hinge-locations of all known entraining devices. In this connection, it is of particular advantage that the lower part of the lateral wall, which is swung out of its closed position to be folded down, because of the initial only minimal lifting movement of the lower hinge-location of the rack on the downwardly projecting lever-arm on the lower part, initially leads the upward swing of the upper part by about 10° to 15° and, when the lateral wall is closed, it lags behind the descending lower part accordingly. Since the adjacent edges of the upper and lower parts lie flush with each other in the closed position, this practically eliminates any danger of the operator's hand becoming trapped.

The lead of the upper part when the lateral wall is opened, and the lag when the said lateral wall is closed, also make it possible, to provide a sealed closure between the two parts of the lateral wall in their closed position. In this connection, the lag, according to the invention, of the lower part, when the lateral wall is closed, ensures that the upper edge-member of the lower part always comes into correct engagement with the upper part—above the lower edge-member thereof.

Austrian Pat. No. 233 629 discloses a two-part folding lateral wall, not of the type according to the present invention, for a railroad freight-car, wherein the two parts are coupled together by means of a vertical shaft and a pair of bevel gears on each side. Apart from the fact that, with this design, it is impossible to slide the upper part under to roof of the car, the said design also lacks the advantage of the lower part of the lateral wall lagging behind the upper part during closing—and vice-versa.

BRIEF DESCRIPTION OF THE DRAWINGS

The invention is illustrated by way of example in the drawing attached hereto, wherein:

FIG. 3 shows the same structure in a partial side elevation in the direction of arrow III in FIG. 1;

FIGS. 4 to 6 each show a partial horizontal section along the lines IV—IV, V—V and VI—VI in FIG. 3;

FIG. 7 is a partial section of the structure according to FIG. 1, with the lower part of the lateral wall partly folded down and the upper part partly folded up;

FIG. 7a shows an enlarged section of FIG. 7 at VIIa (with the changed arrangement of the restoring spring);

Figure 1:
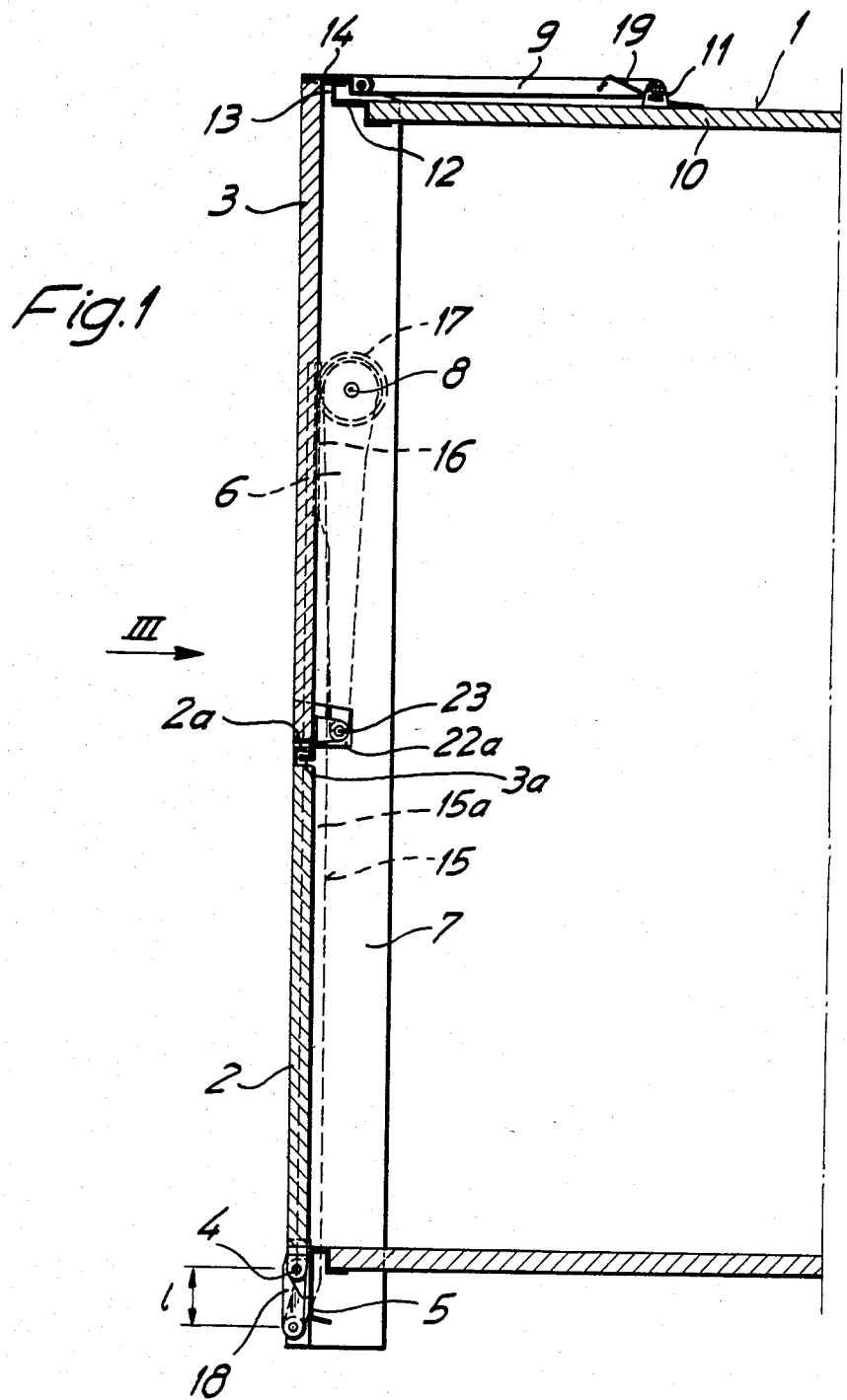
FIG. 1 is a first example of embodiment of a body-structure comprising an entraining device, in partial vertical cross-section along the line I—I in FIG. 3 (with the lateral wall closed)

According to the first example of embodiment illustrated in FIGS. 1 to 8, a body-structure 1 which, in a manner not specially shown, may be a part of a transport-vehicle, i.e., of a truck or a trailer therewith associated, comprises, on at least one of its externally accessible, three of four sides, a lateral wall consisting of a lower part 2 adapted to fold downwardly and an upper part 3 adapted to swing upwardly. Lower part 2 is hinged, at a lower external hinge-point 4 of a lower lateral longitudinal member 5 of the said body-structure and is adapted to fold down outwardly, whereas the upper part 3 is hinged on each side, by means of lower link 6 of a pair of lower links, in the closed position shown in FIG. 1, about half-way up adjacent side-pillars 7 of the said body-structure, by means of a bearing pin 8 and, at the top, by a link 9 of another pair of links and bearings 11 on roof 10.

The length of upper links 9 is equal to approximately half the height of upper part 3 and, with the lateral wall in the closed position shown in FIG. 1, they extend only as far as upper lateral longitudinal member 12 of roof 10, the outer edge 13 of which extends in the upward direction accordingly. The upper edge of upper part 3 comprises accordingly a cover-strip 14 which projects at right angles towards roof 10 and engages, in the closed position shown in FIG. 1, over the aforesaid edge 13, the upper pair of links 9, 9 being hinged to the outer edge of the said cover-strip. Furthermore, and for reasons given hereinafter, outer edge 13 of upper longitudinal member 12 is set somewhat back in relation to the outer edge of lower lateral member 5 associated therewith.

In a manner basically known, upper part 3 is connected to lower part 2 of the lateral wall, by means of an entraining device, in such a manner that when lower part 2 is folded down upper part 3 is simultaneously swung up over roof 10, and vice-versa. In contrast to known entraining devices, the device shown in the first example of embodiment, and also that shown in the second example of embodiment in FIGS. 9 and 10, each comprises a rack-and-pinion drive at both sides of the lateral wall. Rack 15 consists of a rod-part 15a, extending along the relevant side pillar 7, with upper toothing 15 in which a pinion 17 engages, the latter being secured to lower link 6 axially to bearing pin 8 thereof mounted upon relevant side pillar 7.

As may be seen more particularly in FIGS. 1 to 3, 6 and 7, lower part 2 carries at each side a lever-arm 18 projecting downwardly when the said part is closed, the lower end of rod-part 15a being hinged to the free end of the said lever. Pitch-diameter D (cf. FIGS. 3 and 4) of pinion 17 is approximately 1.5 times the length 1 (cf. FIG. 1) of lever-arm 18, so that when lower part 2 is folded downwardly and lever-arm 18 (FIG. 8) is swung upwardly accordingly through 180° out of its downwardly-projecting initial position (cf. FIGS. 1 and 3) lower link 6, associated therewith, is swung from its downwardly-projecting initial position shown in FIGS. 1 and 2, by pinion 17 engaging in toothing 16, through about 180°, to outer edge 13 of upper longitudinal member 12 of the body-structure 1. In this connection it may be seen from FIG. 8, that adequate further movement in the upward direction is permitted only by the fact, previously mentioned, that said longitudinal member 12 is set back in relation to lower longitudinal member 5.

Figure 8:
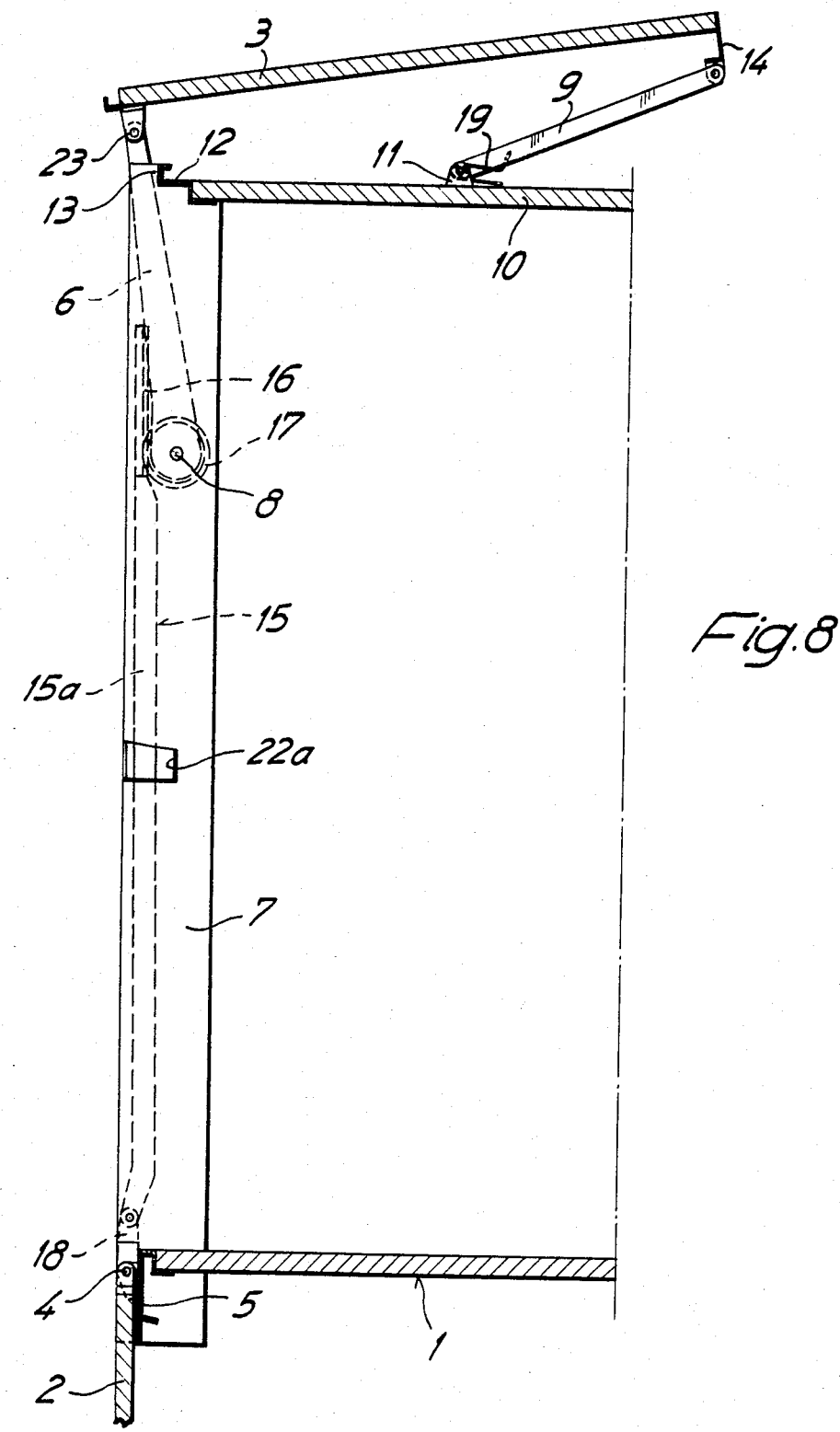
FIG. 8 shows the same section with the lower part completely folded down and the upper part completely folded up.

In order to permit upper part 3, when lower part 2 of the lateral wall is swung back upwardly again, to be swung up again from its terminal open-position shown in FIG. 8, as far as possible without the need for any additional force, together with its upper part, in an upward and forward direction, a return spring 19 is arranged at the hinge-points 11 of the upper pair of links 9, 9 upon roof 10, the said spring being in the form of a helical spring according to the example of embodiment and imparting to relevant links 9 a return-pivoting force corresponding approximately to the weight of upper part 3, to a position directed upwardly at an angle of approximately 30°.

As may be gathered more particularly from FIGS. 2 and 3 to 6, side pillars 7 associated with the lateral wall project, in relation to relevant lower and upper longitudinal members 5 and 12 of body-structure 1, as far as the outer plane of the closed lateral wall, the side pillars associated with the said lateral wall accommmodating rack 15 and pinion 17 and, when the said lateral wall is closed, lower links 6 also, in a suitable rectangular hollow section 20. The said section comprises recesses 21, 22 permitting, only at its outer end-face, the outward pivoting movements of lever-arm 18 and lower link 6 of upper part 3. A section 22a (FIGS. 1 and 2) of recess 22 also projects, in the vicinity of bearing location 23 of link 6 in upper part 3, into the relevant side wall of side pillar 7.

Figure 9:
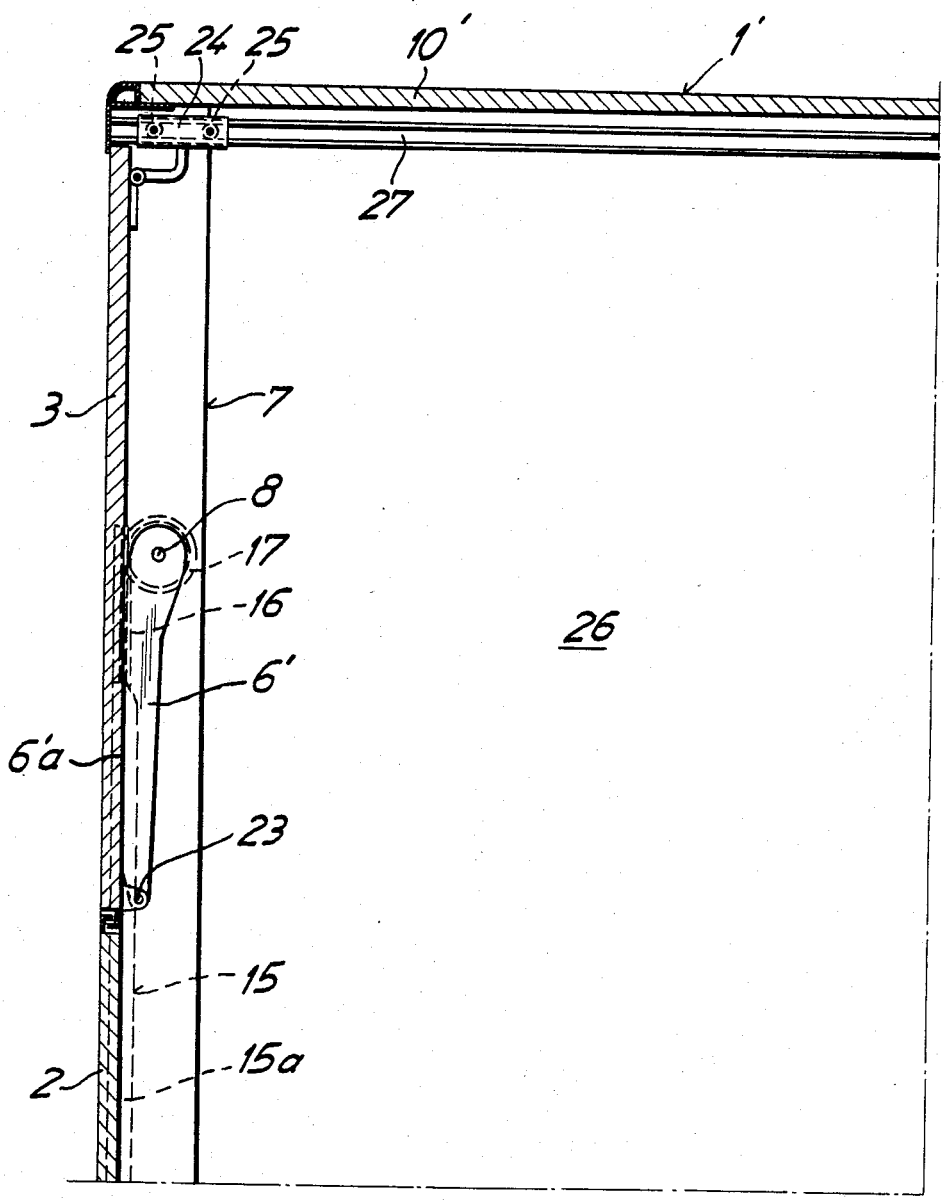
FIG. 9 shows a second example of embodiment of the body-structure in partial vertical section corresponding to FIG. 1 (with the lateral wall closed)
Figure 10:
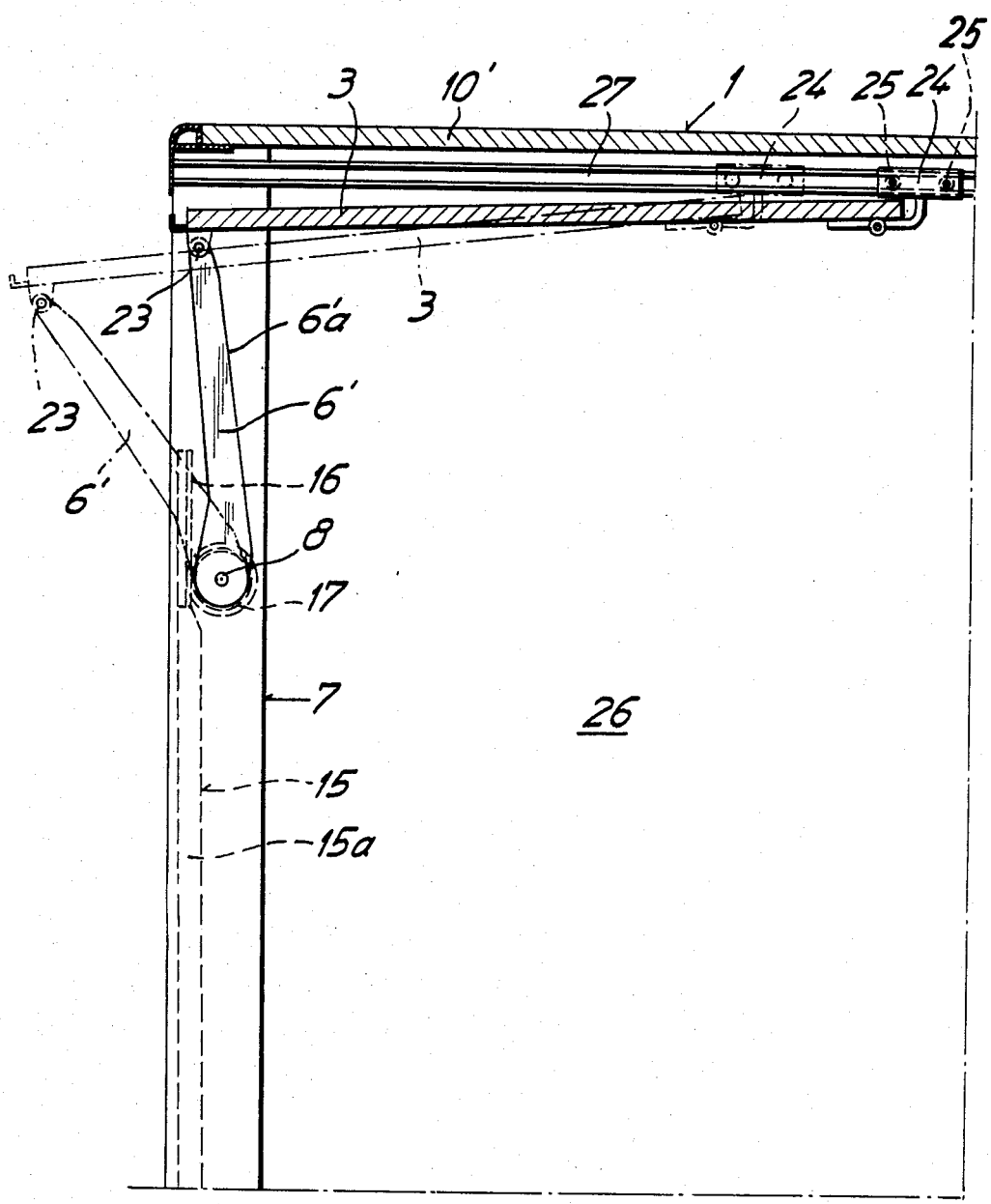
FIG. 10 shows a partial section according to FIG. 9 with the lateral wall open.

The second example of embodiment shown in FIGS. 9 and 10 differs from the first in that upper part 3, hinged at the bottom to links 6′, is hinged in a manner already known per se, by its, in the open position, upper end, on each side, to a slide 24 which is longitudinally displaceable, by means of rollers 25, in a guide-rail 27 secured under roof 10′ along the adjacent end-face 26 of body-structure 1. When the lateral wall is closed, slide 24 is located, in the manner visible in FIG. 9, at the outer end of guide-rail 27 and, when the lateral wall is fully open, at the inner end thereof, as shown in FIG. 10. In this example of embodiment, links 6′ run externally of hollow section 20 adjacent relevant side-pillar 7, to allow upper part 3 to be swung into interior of the body. The outer edges of the said links have linear sections 6′a which, when the lateral wall is closed, bear against the internal surface of upper part 3, the latter thus being held simply and securely in its closed position.

Figure 2:
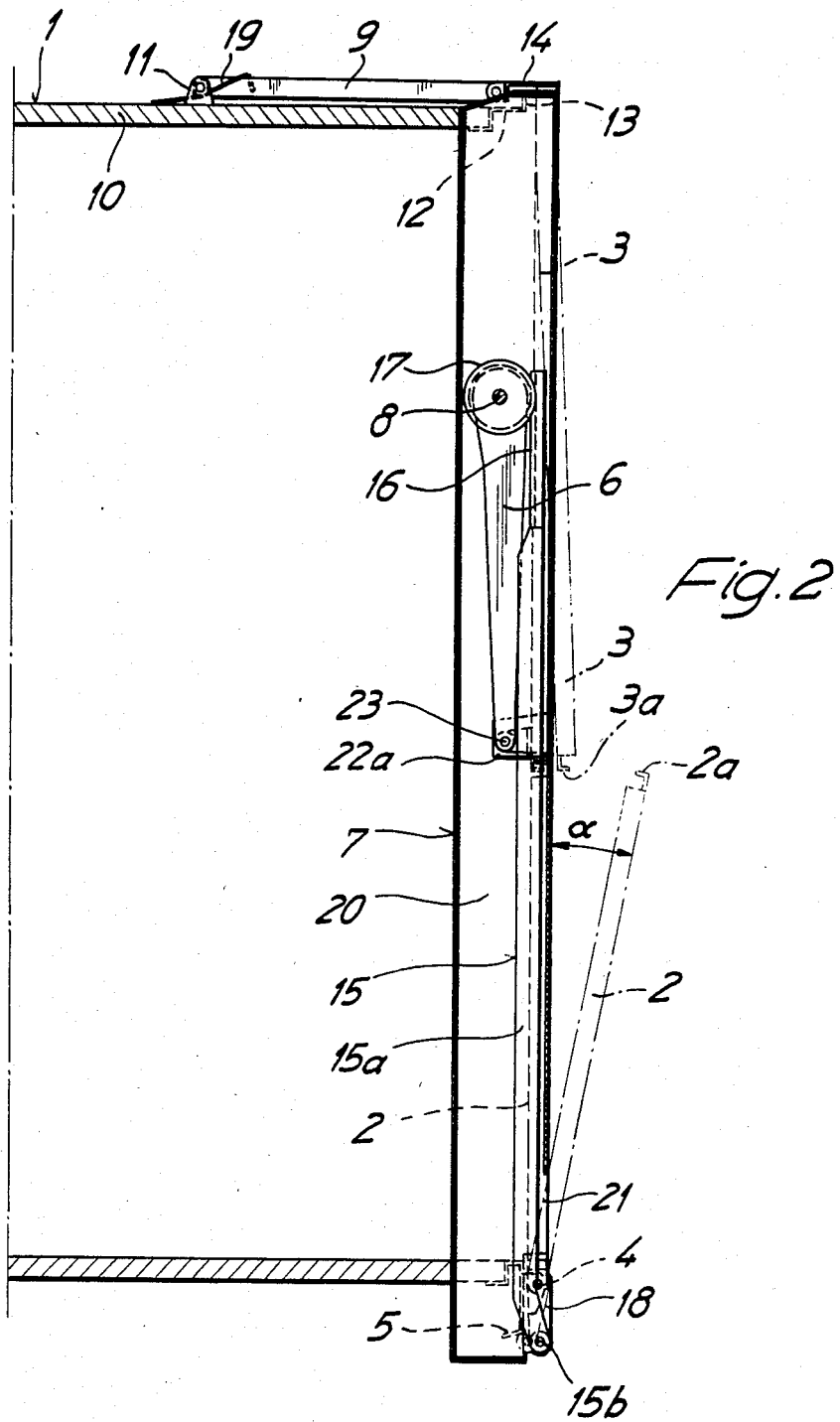
FIG. 2 shows the same structure in a partial vertical cross-section along the line II—II in FIG. 3.

A particular advantage is that the lower part 2, which according to FIG. 1 engages, in its closed position with upper edge-member 2a by means of lower edge-member 3a of upper part 3, leads—as it starts to fold downwardly, because of the initial minimal lift of lower hinge-point 15b of rack 15 on lever-arm 18 on lower part 2, which projects downwardly in the closed position—the upward swing according to FIG. 2 of the upper part by an angle α of about 10° to 15°—and vice-versa. Thus when the lateral wall is closed, edge-member 2a of lower part 2 is always engaged correctly over edge-member 3a of upper part 3. Furthermore, there is thus less danger of the hand of an operator, engaged in folding the lower part upwardly in order to close the lateral wall, becoming trapped in the closing parts of the said lateral wall.

If the structural design of the rack-and-pinion drive, described above and illustrated in the drawing, is preferred, it could, of course, be otherwise designed, for example with the pinion arranged at the bottom and with the rack acting, with an upper rod-part, upon a corresponding lever-arm. In the case of the second example of embodiment, links 6′ for example could also run in hollow section 20 of side-pillars 7, as long as bearing pins, running from their bearing location, 23 are mounted within the plane of upper part 3 on the lateral edges thereof and as long as side pillars 7 comprise, on the relevant side, recesses corresponding to recesses 22 and 22a which accommodate the said bearing pins in the two terminal positions of links 6′.

As is shown in FIG. 7a, the restoring springs 19 could also be hung (attached) on the connecting rod side in a cross hole 28 of the allocated connecting rod 9 and on the roof in a cross hole, which can be chosen from a plurality of cross holes 29 arranged along an arc of a circle of the respectively allocated bearing 11, with which these springs in selective mode of operation can also support the upward swing of the upper part 3.

Instead of being used on a truck or trailer associated therewith, body-structure 1 could, finally, also be arranged stationarily, for example upon the loading ramp of a brewery or some other beverage plant, as an additional storage protected from the weather.

The embodiments of the invention in which an exclusive property or privilege is claimed are defined as follows:

1. A body-structure, more particularly for trucks, comprising a lateral wall consisting of a lower part, adapted to fold down about a lower hinge-location on the body-structure, and of an upper part which is hinged at the bottom, on both sides, by a pair of links, approximately half-way up, to the adjacent side posts and, at the top, either by an additional pair of links on the roof or, on each side, to a slide adapted to be displaced along a guide-rail running on the relevant end-wall close below the roof and at right angles to the lateral walls, and which is swung upwardly by an entraining device extending from the bottom of the lower part and engaging, for example, with its two lower links when the said lower part is folded down from its closed position either above or below the roof, characterized in that the entraining device consists of a rack-and-pinion drive located on each side of the lateral wall and guided on side posts, the said rack being hinged, by means of a lower part, to a lever arm projecting downwardly in the closed position, from the said lower part and engaging at the top with toothing running along the outside of the hinge-location of the relevant lower link, in which toothing a pinion engages, the said pinion being secured to the said link axially of the bearing location thereof, and the pitch-diameter of the said pinion being about 1.5 times the length of the said lever-arm.

2. A body-structure according to claim 1, characterized in that the lower part comprises, at its upper edge, an edge-member which, when the lateral wall is closed, engages from the outside over an edge-member located at the lower edge of the upper part.

3. A body-structure according to claim 1 or 2, characterized in that the side pillars accommodate at least the racks and pinions in a suitable rectangular hollow section.

4. A body-structure according to claim 3 in which the upper part of the lateral wall is adapted to pivot onto the roof, characterized in that, when the lateral wall is closed, the side pillars also accommodate the lower links in their hollow section, the said section comprising, in the area of its outer end-face only, recesses permitting outward pivoting of the lever-arm of the lower part and of the lower links of the upper part.

5. A body-structure according to claim 1, characterized in that the length of the upper links is equal to about half the height of the upper part, a return-spring being arranged at their hinge-locations located upon the roof, the said return spring exerting upon the relevant links, a return force corresponding approximately to the weight at that point of the said upper part, approximately as far as the position thereof directed upwardly at 30°.

6. A body-structure according to claim 1, characterized in that the upper edge of the upper part comprises a cover strip projecting at right angles towards the roof, the upper links being hinged to the outer edge of the cover-strip which engages, when the upper part is closed, over the adjacent edge of the roof.

7. A body-structure according to claim 3 having a lateral wall adapted to swing under the roof, characterized in that the lower links run externally of the hollow profile at the side of the relevant side pillars, each exhibiting at its outer edge a linear part which, when the lateral wall is closed, bears against the internal surface of the upper part.

8. A box body according to claim 5, characterized in that on the connecting rod side the restoring springs are respectively hung in a cross hole of the allocated connecting rod and on the roof are hung in a cross hole, which can be chosen from a plurality of cross holes arranged along a concentric arc of a circle, of the respective allocated bearing.

* * * * *